United States Patent [19]

Griffaton

[11] Patent Number: 5,252,804
[45] Date of Patent: Oct. 12, 1993

[54] LASER BEAM WELDING CANE, PARTICULARLY FOR THE SEALING OF TUBES

[75] Inventor: Jacques Griffaton, Chalon sur Saone, France

[73] Assignee: Framatome, Courbevoie, France

[21] Appl. No.: 883,765

[22] Filed: May 15, 1992

[30] Foreign Application Priority Data

May 15, 1991 [FR] France ................. 91 05903

[51] Int. Cl.⁵ .............................. B23K 26/00
[52] U.S. Cl. .................. 219/121.63; 376/260; 219/121.83
[58] Field of Search ............... 376/260, 245; 219/121.63, 121.64, 121.74, 121.76, 121.78, 121.83; 250/212

[56] References Cited

U.S. PATENT DOCUMENTS 3,860,863 1/1975 Lamprecht ................. 250/212
4,983,796 1/1991 Griffaton ................. 376/260
5,006,268 4/1991 Griffaton ................. 219/121.63

FOREIGN PATENT DOCUMENTS 0408405 1/1991 European Pat. Off. .
2832847 2/1980 Fed. Rep. of Germany .

Primary Examiner—Daniel D. Wasil
Attorney, Agent, or Firm—Pollock, Vande Sande & Priddy

[57] ABSTRACT

The welding cane is equipped with a welding head (1) comprising an optical fiber (5) which emits a laser beam focused by an optical device (9) onto a wall (10) to be welded where a weld puddle (12) is formed. The welding head (1) comprises a photoelectric cell (45) illuminated by the scattered light around the end of the optical fiber. The signal emitted by the photoelectric cell (45) depends on the integrity of the optical fiber (5) and on the energy utilized for welding. It is used in the welding of a sealing sleeve in a pressurized water nuclear reactor steam generator tube.

5 Claims, 1 Drawing Sheet

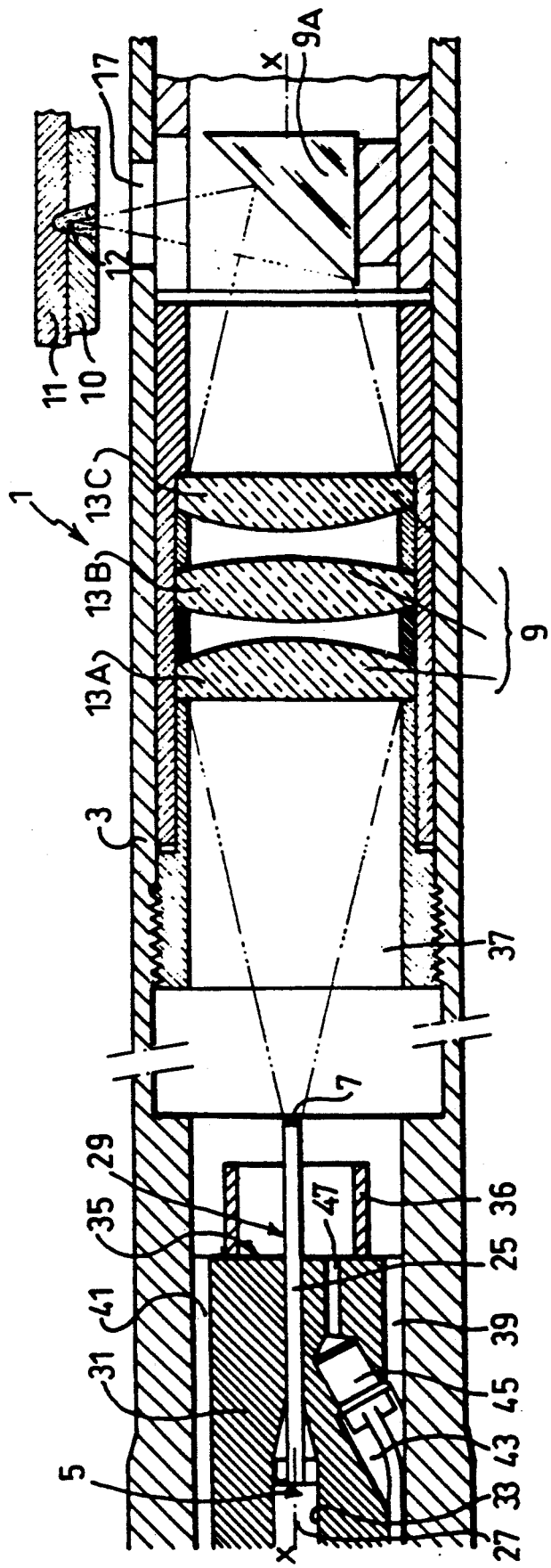

LASER BEAM WELDING CANE, PARTICULARLY FOR THE SEALING OF TUBES

FIELD OF THE INVENTION

The present invention relates to a laser beam welding cane and its use for fixing a sleeve in a tube by circular welds.

BACKGROUND OF THE INVENTION

A welding cane of the type having a laser beam conducted by an optical fiber to a welding head of the cane is known in the art, the welding head comprising an optical device for focusing the laser beam and a mirror 9A reflecting the laser beam towards a welding site external to the welding head.

Welding canes are utilized in particular for sealing sleeve welding operations in the pressurized primary coolant pipes of a pressurized water nuclear reactor steam generator.

A consequence of the high power of the laser beam utilized in this type of welding cane is that, in the event of a defect appearing in the optical fiber, the latter rapidly deteriorates and may be destroyed at a rate of several tens of centimeters per second.

SUMMARY OF THE INVENTION

The object of the invention is especially to detect possible deterioration of the optical fiber of the welding cane and to determine the level of energy which is emitted by the laser and that which is radiated by the wall to be welded.

For this purpose, the subject of the invention is a welding head of the aforementioned type which comprises a photoelectric cell for measuring the intensity of radiation disposed in such a manner as to be offset in relation to the axis of the optical fiber and set back in relation to the distal end of this fiber.

According to other characteristics of the invention:
the photoelectric cell comprises means for attenuating its illumination;
the attenuation means comprise a light pipe, parallel to the optical fiber, forming a passage for the radiation which illuminates the photoelectric cell;
the photoelectric cell has a position, inclined in relation to the axis of the pipe, which is intermediate between a first position of maximum illumination of the cell, parallel to the axis of the light pipe, and a second position, perpendicular to the first, of minimum illumination of the cell; and
the photoelectric cell is a silicon cell.

Another subject of the invention is the use of a welding cane for fixing a sleeve in a tube by circular welds and, in particular, a repair sleeve in a nuclear reactor steam generator tube.

The invention is used for surveying the integrity of an optical fiber disposed in a welding cane and transmitting a welding laser beam between an electrically controlled laser source and a zone for receiving the cane, the welding cane comprising an optical device for focusing the beam reaching into the reception zone and a mirror directing the laser beam towards a welding site, and operates as follows:

Radiation, scattered and/or reflected by the optical device into the zone for receiving the cane, is sensed, which radiation is representative of the energy transmitted by the optical fiber and of the energy received and scattered by the welding site and reflected by the mirror back into the zone for receiving the cane;
the sensed radiation is converted into an electrical signal;
the electrical signal is compared with a predetermined threshold; and
when the electrical signal is less than the threshold, the power supply to the laser source is switched off.

BRIEF DESCRIPTION OF THE DRAWING

An embodiment of the invention will now be described in more detail with reference to the single attached figure which is a schematic view in longitudinal cross-section of a portion of a welding head of a welding cane according to the invention.

DESCRIPTION OF PREFERRED EMBODIMENT

The figure shows a welding head 1 of a laser beam welding cane. The welding head 1 is delimited by a wall 3 of generally tubular shape on the inside of which is disposed an optical fiber 5 whose distal end 7 emits a laser beam in the direction of an optical device 9.

The optical device 9 focuses the laser beam emitted by the end 7 of the optical fiber. This beam is reflected by a mirror 9A onto a sealing sleeve 10, external to the welding head 1 and intended to be welded in a pressurized water nuclear reactor steam generator tube 11. The tube 11 usually has a diameter less than approximately 20 mm. The laser beam heats the sleeve 10 and the tube 11 by forming a weld puddle 12.

The optical device 9 comprises two to three juxtaposed lenses 13A, 13B, 13C for collimating and focusing the laser beam. The mirror 9A is inclined at 45° and adapted to reflect radially the focused laser beam through a lateral window 17 of the welding head onto the sleeve 10 to be welded.

The head 1 is rotatable about its axis X—X, which is also the axis of the optical fiber 5. The rotation of the welding head 1 makes it possible to carry out circular welds.

The optical fiber 5 conducting the laser beam and its disposition in the welding head will now be described. The optical fiber 5 comprises a core 25 surrounded by a cladding 27 except over its terminal portion 29 which is bare. The optical fiber 5 is supported by a positioning sleeve 31 while being inserted into an axial pipe 33 of the latter. The pipe 33 emerges from the end face 35 of the positioning sleeve 31 into a zone for receiving the terminal portion 29 of the optical fiber 5 delimited by the inside of a ring 36 extending the sleeve 31 along the axis X—X. The terminal portion 29 of the optical fiber traverses the ring 36 and projects into a chamber 37 separating the sleeve 31 from the optical device 9, perpendicularly to the end face 35 of the sleeve and along the axis X—X, over a length which may reach or even exceed 10 mm. The projecting disposition of the terminal portion 29 makes it possible for the end 7 of the optical fiber to emit a high power laser beam without deterioration of the fiber by heating.

The positioning sleeve 31 further comprises longitudinal peripheral grooves 39, 41 forming passages for neutral or active gases usually utilized for controlled-atmosphere welding operations. For the same purpose, the lenses comprise lateral notches (not shown) or are supported by perforated sheaths and ties (not shown) which enable the gas to pass.

The figure also shows that the positioning sleeve 31 comprises, from its peripheral wall, a blind hole 43 inclined in relation to the axis of the sleeve, where a photoelectric cell 45 is housed and, from its end face 35, a light pipe 47 parallel to the axis of the positioning sleeve, connecting the bottom of the inclined hole 43 to the chamber 37. The light pipe 47 emerges on the inside of the ring 36.

The passage of the high power laser beam through the diopters of the optical device 9 creates reflections and multiple scattering of rays which illuminate the chamber 37 and the inside of the ring 36 around the terminal portion 29 of the optical fiber. Likewise, the weld puddle 12 scatters radiation which is reflected back by the mirror 9A and which is propagated by the optical device 9 in the chamber 37 in a generally upstream direction opposite to the direction of the laser beam.

The cell 45 is positioned in the welding head 1 in such a manner as to be illuminated by the radiation thus scattered in the chamber 37 and the inside of the ring 36.

The photoelectric cell 45 is adapted to receive radiation of low luminous intensity in relation to the power of the laser. The radiation scattered in the chamber 37 and the inside of the ring 36 has an intensity liable to dazzle and to saturate the photoelectric cell 45. The arrangement of the photoelectric cell 45 in the welding head 1 makes it possible to avoid the dazzling of the cell. The photoelectric cell 45 is illuminated only by the scattered radiation in the chamber 37 and which traverses the light pipe 47. The latter attenuates the illumination of the photoelectric cell 45 and adapts it to the sensitivity of the cell.

The photoelectric cell 45 supplies an electrical signal which varies as a function of the inclination of the rays which illuminate it, the flux being a maximum for rays parallel to the axis of the cell and a minimum for rays perpendicular to this axis. The inclined position of the cell 45 in the hole 43 of the positioning sleeve is intermediate between a first position, parallel to the axis of the light pipe 47, of maximum illumination of the cell 45 and a second position, perpendicular to the position, of minimum illumination of the cell 45.

When the optical fiber 5 conducting the laser beam is working properly, the photoelectric cell 45 receives a certain illumination and produces an electrical signal which is a function thereof. In order to detect possible deterioration of the optical fiber 5, this signal is compared to a threshold fixed by experience, which depends especially on the geometry of the welding head, on the quality of construction of the parts, on the quality of the weld and on the power emitted by the laser. When the signal is greater than or equal to the predetermined threshold, the proper working of the fiber is ensured. When the signal becomes less than the predetermined threshold, a command is given electrically to switch off the laser source; this makes it possible to stop deterioration of the optical fiber.

Moreover, the electrical signal supplied by the photoelectric cell 45 is a function of the total energy emitted by the laser and supplied by the weld puddle 12, this makes it possible to assess the quality of the weld puddle 12.

The photoelectric cell 45 makes it possible therefore to survey the integrity of the optical fiber 5 while it is disposed inside the welding head.

Thus, it is ensured that a weld is made under correct conditions and that the next weld takes place under the correct conditions for transmitting the power of the laser source through the optical fiber.

The use of the welding cane according to the invention for the welding of a sealing sleeve in a nuclear reactor steam generator tube has been shown, but the welding can can also be used for welding various kinds of walls.

I claim:

1. Welding cane having a laser beam conducted by an optical fiber to a welding head of said cane, said welding head comprising an optical device for focusing said laser beam and a mirror reflecting said laser beam toward a welding site external to said welding head, wherein said welding head comprises a photoelectric cell for measuring an intensity of radiation scattered inside said welding head, around a distal end portion of said optical fiber, said photoelectric cell being disposed in the vicinity of the optical fiber and set back in relation to said distal end portion of said optical fiber.

2. Welding cane according to claim 1, wherein said photoelectric cell comprises means for attenuating illumination of said photoelectric cell.

3. Welding cane according to claim 2, wherein the attenuation means comprise a light pipe, parallel to said optical fiber, forming a passage for only a part of radiation scattered around said distal end portion of said optical fiber, said part being adapted to illuminate said photoelectric cell.

4. Welding cane according to claim 3, wherein the photoelectric cell has a position, inclined in relation to the axis of the light pipe, which is intermediate between a first position, parallel to the axis of the light pipe, of maximum illumination of the cell, and a second position, perpendicular to the first, of minimum illumination of the cell.

5. Welding cane according to claim 1, wherein said photoelectric cell is a silicon cell.

* * * * *